Nov. 12, 1957 S. DOBA, JR 2,813,157

SINGLE FREQUENCY TRANSMISSION LINEUP FOR AMPLIFIERS

Filed Sept. 7, 1954 2 Sheets-Sheet 1

INVENTOR
S. DOBA, JR.
BY
ATTORNEY

SINGLE FREQUENCY TRANSMISSION LINEUP FOR AMPLIFIERS

Filed Sept. 7, 1954 2 Sheets-Sheet 2

INVENTOR
S. DOBA, JR.
BY W. L. Keefauver
ATTORNEY 2,813,157

SINGLE FREQUENCY TRANSMISSION LINEUP FOR AMPLIFIERS

Stephen Doba, Jr., Berkeley Heights, N. J., assignor to Bell Telephone Laboratories, Incorporated, New York, N. Y., a corporation of New York Application September 7, 1954, Serial No. 454,397

6 Claims. (Cl. 179—171)

This invention relates to video amplifiers and, in particular, to measuring or adjusting the frequency characteristics of such amplifiers.

Video and other broad band amplifiers are customarily provided with load circuits which include reactive elements designed to compensate for high and low frequency transmission variations. At least one of these reactive elements is usually made variable to permit "lining up" the amplifier periodically.

In lining up a video amplifier having a single reactive adjustment, it has heretofore been the practice to apply two test signals to the amplifier, one at a frequency relatively low in the passband of the amplifier and the other relatively high. With this method, the amplifier gain is then adjusted so that the measured gain is equal at the two frequencies.

This prior art method requires accurate measurement of the input test signals and often readjustment of the signal generator, should its output vary with frequency. Also, an accurately calibrated detector is required to measure the gain at the two frequencies.

This prior art method has further disadvantages in lining up either multistage amplifiers or single-stage amplifiers having frequency-sensitive networks connected to their output and/or input. In the case of a multistage amplifier, it is necessary to insert the test signal, for example, by probes, directly on the input of the stage being lined up, commencing with the last stage and working back. In the other case mentioned, it is necessary to avoid passing the test signal through the frequency-sensitive network, for example, by inserting the test signal directly on the amplifier grid and by measuring the gain at the output of the amplifier ahead of the frequency-sensitive output network.

An object of the present invention is to simplify the lining up of video amplifiers.

A further object is to avoid the various disadvantages inherent in prior art methods discussed above.

Another object of the invention is to avoid the frequency-sensitive effects of either another stage or associated networks when adjusting the gain of an amplifier.

In accordance with an illustrative embodiment of the invention to be described in more detail below, a video amplifier having a reactive load network with a single adjustment is lined up with measurements at only one frequency; in the example below, a 4.5 megacycle test signal is employed. The equivalent of a low frequency gain measurement is made by short-circuiting the shunt reactances in the load network and by substantially eliminating the effects of parasitic capacities. The latter is accomplished with a variable test coil which is inserted and adjusted to voltage resonance with the stray interstage capacities. This measurement serves as a reference. The short-circuit and test coil are then removed and the gain adjusted to equal the reference low frequency gain.

A feature of the invention is its independence of the frequency-sensitive characteristic of any connecting networks or other amplifying stages, achieved by making both gain measurements at the same frequency. It is thus possible, for example, to line up a multistage amplifier merely by applying the test signal to the normal input of the amplifier and measuring the gain at the normal output of the amplifier. The stages may be adjusted in any order and regardless of any frequency-dependent networks such as cables, equalizers, etc., which may exist between the normal input and output of the amplifier.

Other features and objects of the invention will be more readily understood from a consideration of the following detailed description of several illustrative embodiments when read in accordance with the attached drawings, in which.

Figure 1:
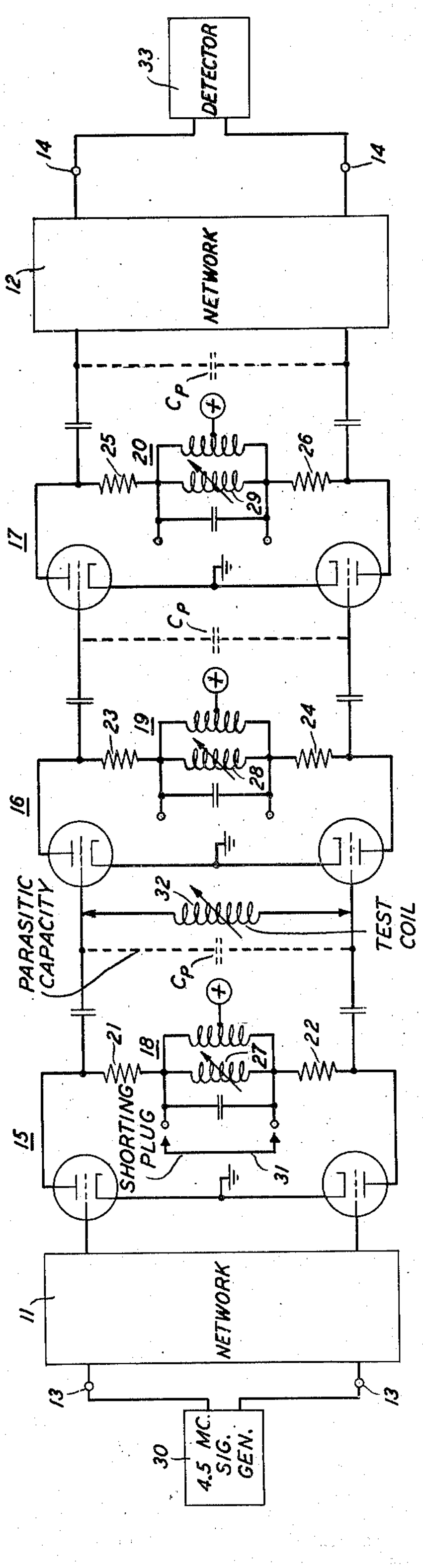
Fig. 1 is a skeletonized circuit diagram of a three-stage balanced video amplifier to which principles of the invention have been applied.

In Fig. 1, there is shown a skeletonized version of a three-stage balanced amplifier having input and output networks 11 and 12 and input and output terminals 13 and 14. Each of the balanced amplifying stages 15, 16 and 17 has a reactive load network 18, 19 and 20 for high frequency compensation in addition to the plate resistors 21—26. Further, each of these networks includes a variable coil 27, 28 and 29 for lining up its associated stage. The input and output networks 11 and 12 may or may not have a frequency-dependent transmission characteristic.

Figure 2:
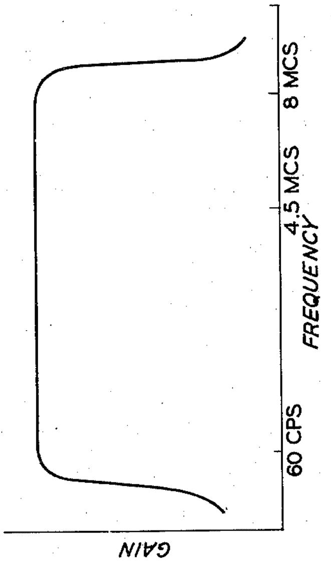
Fig. 2 shows the gain-frequency characteristic of the Fig. 1 amplifier.

To line up this amplifier in accordance with the present invention, it is not necessary to apply a test signal directly to the input of each stage but merely to apply a test signal from a signal generator 30, as shown, to the normal amplifier input terminals 13. The amplifier shown is designed to pass a 4.5 megacycle video signal and is designed to have a passband which is flat from approximately 20 cycles per second to nearly eight megacycles. The desired transmission characteristic is illustrated in Fig. 2. A 4.5 megacycle signal, relatively high in the passband of the amplifier, is therefore chosen as a test signal. The stages may be lined up in any order; for illustrative purposes, the input stage 15 will be lined up first.

In accordance with the invention, the shunt reactances 18 in the interstage network between the first two stages are short-circuited by a shorting plug 31. A test coil 32 is then connected across the two leads interconnecting the first two stages and adjusted to voltage resonance with the parasitic capacities $C_p$ which exist between these two stages. Voltage resonance will be indicated by a peak reading on the detector 33 which may be connected to the normal output 14 of the amplifier, as shown With the interstage thus modified, the amplifier 15 load circuit other than coupling elements is primarily resistive. This is substantially what the amplifier load circuit would be at a very low frequency such as 60 cycles per second, namely, the resistance of the plate resistors 21 and 22. A peak reading of the detector 33 is obtained by adjusting the test coil 32 and is therefore noted as a reference equivalent to a low frequency gain measurement. The test coil 32 and short-circuit 31 are then removed and, if necessary, the adjustable coil 27 in the interstage network is adjusted to equate the gain as now measured by the detector with the reference low frequency value.

Thus, the gain at 4.5 megacycles is made equal to the gain at a simulated 60 cycles, and adjustment of the first stage is completed.

In making these two gain measurements, it may be noted that any effect of either the input 11 or the output 12 network or of the other two stages 16 and 17 is the same in both cases, since the frequency of the test signal is the same for both measurements. Transmission through all components other than the stage under test is the same for both measurements. The remaining two stages may be lined up in the same manner without reconnecting either the signal generator 30 or detector 33.

Figure 3:
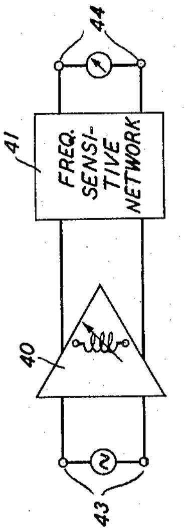
Fig. 3 is a block schematic diagram of a single-stage amplifier having a frequency sensitive network connected to its output to which principles of the invention are applicable.

The principles of the invention are not restricted to multistage amplifiers but are also applicable to single-stage amplifiers. Further, although not restricted to single-stage amplifiers having associated frequency-sensitive networks connected to either their input and/or output, their greatest advantage over prior art methods is realized where the amplifier does have integrally associated with it a network such as the network 41 in Fig. 3 which has a frequency-dependent characteristic. With the prior art methods, it is generally necessary to remove network 41 and terminate the amplifier output with a resistance before measuring the amplifier gain. By employing principles of the present invention, however, the test signal may be applied directly to the normal input terminals 43 of the amplifier and the gain measured at the normal output terminals 44 without removing network 41 or altering the amplifier termination. Since the same frequency is used for both gain measurements, the frequency-dependent characteristic of the network 41 will not affect the measurements.

Figure 4:
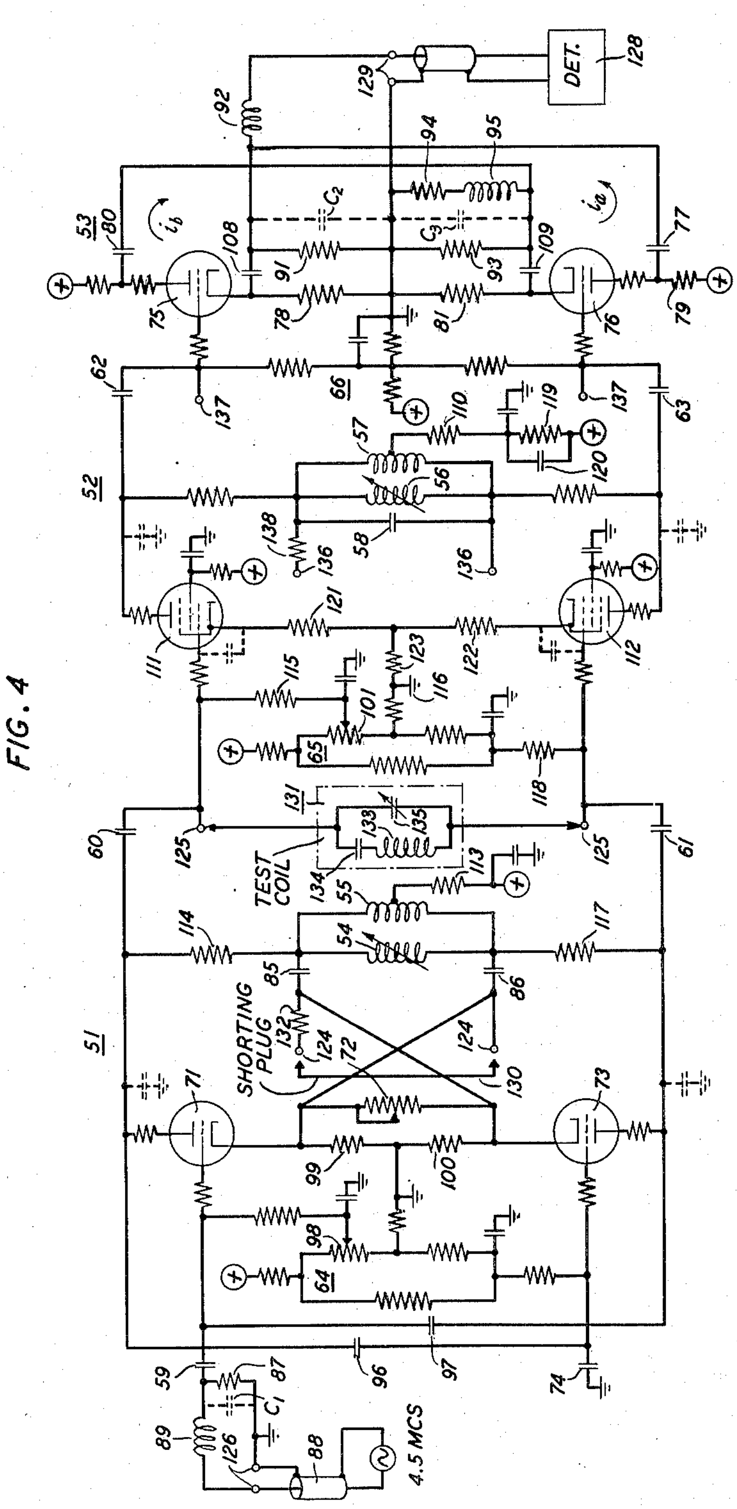
Fig. 4 is a detailed circuit diagram of a three-stage video amplifier to further illustrate principles of the invention.

To illustrate more fully the application of the invention to a multistage amplifier, such an amplifier is illustrated in Fig. 4. This amplifier is designed to provide broad band gain to a 4.5 megacycle video signal. The amplifier consists of three balanced stages 51, 52 and 53, although it receives and delivers unbalanced signals. Balanced stages are employed to reduce sensitivity to low frequency interference on the power supply bus and to provide the balanced drive required for the output stage 53 which is specially designed to reduce second harmonic distortion. The flat band width is extended to about eight megacycles by means of shunt peaking in the interstage networks. The peaking networks consist of the two coils 54, 55, in the first interstage and the two coils 56, 57, and the condenser 58 in the second interstage. Flat gain is extended well below 60 cycles by employing large valued coupling condensers such as condensers 59 to 63, and 74, 77, 80, 108 and 109 and large valued grid leak resistor.

An unbalanced input signal *e* arriving at the grid of tube 71 from the coaxial cable 88 appears on the cathode of this tube as $e/2$ if the gain control potentiometer 72 is set to zero resistance. The grid cathode potential of this tube is, therefore, approximately $e/2$. The control grid of the other tube 73 of this stage is at ground potential for alternating current signals due to the condenser 74 so that the grid-to-cathode potential of this tube is approximately $-e/2$. This connection, therefore, provides the equivalent of a balanced drive of *e* volts on the input stage.

The balanced output signal of the first stage is applied to a second balanced stage 52 which further amplifies the signal. The balanced output of the second stage is applied to a third balanced stage 53 which converts the signal from a balanced to an unbalanced signal and also reduces second harmonic currents generated within the stage.

The output signal from the third stage is taken from the cathode of the upper tube 75 through a coupling condenser 108. Resistor 91 in parallel with the active cathode impedance gives a net load impedance of 75 ohms to match the output cable.

The second harmonic current $i_a$ generated in the lower tube 76 flows through condenser 77 and the cathode resistor 78 of the upper tube in parallel with the load impedance where it opposes the second harmonic current $i_b$ generated in the upper tube. If the currents $i_a$ and $i_b$ are equal, the net second harmonic current flowing through cathode resistor 78 and the load resistance will be zero and no second harmonic current will appear at the output terminals 129.

The plate resistor 79 of tube 76 is large compared to the parallel combination of resistor 78 and the load resistance so that practically none of the second harmonic current generated in the lower tube flows through resistor 79. Although the second harmonic currents cancel at the output terminals, the fundamental signal currents add because they are in phase.

Since effective cancellation of second harmonic currents depends on symmetry and equality of second harmonic currents, the circuit is kept symmetrical by a dummy load resistor 94 and a resistor 93 similar to resistor 91. Also, a second condenser 80 completes a loop for currents through the cathode resistor 81 of the lower tube in parallel with the net dummy load resistance in the same manner as condenser 77 completes a loop for the upper tube. Condenser 109 is similar in function to condenser 108.

A manual gain adjustment is provided in the first stage by the potentiometer 72 connected between the cathodes of the tubes 71 and 73. This potentiometer provides variable local feedback. It also causes the effective tube resistances of the triodes 71 and 73 to vary in accordance with the setting of the potentiometer. Since the plate resistances of these tubes contribute to the effective impedance of the first interstage, any change in these resistances results in a change in the interstage gain versus frequency characteristic. To compensate for this effect, a small amount of corrective feedback is introduced by cross-connecting the ends of the reactive interstage network 54, 55 and the cathodes of the input tubes 71 and 73 by means of condensers 85 and 86. At the higher frequencies, these condensers provide a small current of phase opposite to the cathode current through the potentiometer resistance 72, thereby reducing its voltage drop. Hence, the relative gain of the stage is increased at higher frequencies by an amount equal to the gain reduction caused by the increase in plate resistance. This connection, in effect, provides frequency-sensitive variable positive feedback to compensate for the variations in negative feedback when the gain control potentiometer 72 is varied. The compensating circuit just described is disclosed in more detail and claimed in a copending application of E. H. Weber Serial No. 454,497 and filed of even date herewith.

At the lower frequencies, the input impedance of the amplifier is determined by the resistor 87 which provides a 75 ohm input impedance. At the higher frequencies, however, the presence of parasitic capacitance $C_1$ across this resistor tends to vary this impedance. An inductor 89 is therefore included which, in combination with the 75 ohm input impedance and parasitic capacitance $C_1$ forms a low pass filter whose cut-off is high relative to the 8 megacycle upper limit of the transmission band.

The output impedance is similarly determined at low frequencies by the parallel combination of resistors 91, 78, and the cathode impedance of tube 75. A coil 92, in combination with above defined impedance and the parasitic capacity $C_2$ performs a function similar to inductor 89. Coil 95 is similar in function to coil 92.

Since triodes are employed in the first stage 51, cross-neutralization of the grid plate capacitance of these two tubes is employed. Cross-neutralization is accomplished by the two condensers 96 and 97.

The potentiometer 98 provides a differential control of the direct current cathode currents of the first stage by changing the bias on the upper tube 71 only. This action depends on the fact that the sum of the currents of these tubes is held constant by the large longitudinal direct current feedback provided by the cathode resistors 99 and 100. Therefore, if the fixed bias of the upper tube is made more positive by adjusting the potentiometer 98, the current in this tube is increased by a given amount but, as a result of the direct current feedback, the current in the lower tube is decreased by the same amount. The currents in the two tubes 71 and 73 can be made equal by adjusting the potentiometer 98 for zero volts across the two cathode resistors, 99, 100, i. e., from cathode to cathode. A potentiometer 101 provides a similar control in the second stage 52. No manual current adjustment is provided for the output tubes because the direct current feedback provided by the two resistors 78 and 81 acts on the individual currents of each tube to hold them approximately equal.

If the power supply is imperfectly filtered below 60 cycles per second, low frequencies such as 25 cycles per second and lower will appear in the direct current power supply. This interference, designated "bobble," will appear in almost full amplitude on the grids of the two tubes 111 and 112, in the second stage, being introduced through the interstage network of the first stage. One path of bobble current may be traced through resistor 113, inductor 55, plate resistor 114, coupling capacitor 60, resistor 115 and through the bleeder resistor network 65 to ground 116. Since the resistance from the grid of tube 111 to ground is large compared to the resistance from the grid to the B+ bus, almost the full bobble voltage appears on the grid of this tube. Similarly, the same voltage appears on the grid of the lower tube 112 by way of plate resistor 117, condenser 61, resistor 118 and network 65.

Bobble is also introduced in the output of the second stage 52 from the plate supply and plate resistor 110. The bobble introduced through resistor 110 stage will be out of phase with the bobble introduced through the plate resistor 113 of the first stage due to the phase reversal in the stage 111, 112. A resistor 119 is therefore provided in the plate supply of the second stage to give a longitudinal gain such that the induced bobble voltage from the first stage will be equal in amplitude and opposite in phase from the bobble voltage introduced in the second stage. This resistor is bypassed by a condenser 120 to reduce the longitudinal gain at the higher video frequencies.

The undesignated resistors connected directly to grids or plates are for the prevention of parasitic oscillations. All undesignated capacitors are for bypass purposes. Resistors 121 and 122 in the second stage provide degenerative feedback while resistor 123 acts in the suppression of longitudinal currents.

In order to line up the amplifier in accordance with the principles of the invention, pin jacks are provided for the insertion of test fixtures. By way of example, two pairs of jacks 124 and 125 are provided for lining up the first stage.

In lining up the amplifier, a 4.5 megacycle test signal is applied to the normal input terminals 126 of the amplifier over cable 88 and a detector 128 for measuring the output signal is connected to the normal output terminals 129. To make the equivalent of a low frequency measurement of the first stage, a shorting plug 130 is connected across the pin jacks 124 in the first stage, and a test coil 131 is connected across the pin jacks 125. Several deviations from the simplified arrangement illustrated in Fig. 1 may be noted. In the first place, the test coil 133 has some dissipation which, at a given frequency, may be represented as a resistor in parallel with the coil. This equivalent resistor shunts the load which, if uncompensated for, would produce an error in the simulated low frequency measurement. Compensation for this equivalent resistance is provided by shunting the interstage peaking coil with a resistor 132 instead of a short-circuit. The value of this resistor may be determined empirically to compensate not only for the equivalent dissipation resistance of the test coil but also for other variations from an ideal low frequency gain measurement which result from making the test at a high frequency. In the actual amplifier shown, this resistor was 39 ohms.

Secondly, since the adjustment of a variable coil is usually accompanied by a change in its resistance, a fixed test coil 133 and series condenser 134, both in parallel with a variable condenser 135 are employed to resonate the stray capacities in the interstage network. Therefore, with the shorting plug inserted in the test jacks 124, the condenser 135 is varied until a maximum reading on the detector 128 is observed. This reading is recorded as the equivalent low frequency gain. The test coil 131 and shorting plug 130 are then removed and the coil 54 varied, if necessary, to adjust the high frequency gain to equal the low frequency gain. During these tests, all potentiometers are given normal setting.

The second stage 52 may be lined up similarly to the first stage utilizing test jacks 136 and 137. It is likely that the resistor 138 in this stage will have a value different from that in the first stage and again may be determined empirically. In the circuit shown, this resistor 138 in the second stage had a value of 36 ohms. Factors which may lead to the differences in the values of resistors 132 and 138 are the absence in the second stage of a compensating connection such as provided by condensers 85 and 86 in the first stage and the fact that stage one employs triodes while stage two uses pentodes.

As noted above, the suggestion that stage one be lined up first was purely arbitrary since, in accordance with one feature of the invention, the various stages may be lined up in any order.

The detailed discussion above is in terms of balanced amplifiers. It should be obvious, however, that the principles of the invention are equally applicable to unbalanced circuits. In fact, numerous other modifications and embodiments will readily occur to one skilled in the art so that the invention should not be deemed limited to the specific embodiments shown and described.

What is claimed is:

1. The method of measuring the effective gain of a broad band amplifier to a high and a low frequency within said band which comprises the steps of making a first gain measurement with a single-frequency test signal of said high frequency and a simulated amplifier load impedance for a test signal of said low frequency, and making a further gain measurement with said high frequency test signal and the amplifier load impedance unmodified.

2. The method of adjusting the gain of one of the stages of a video amplifier having a plurality of stages and at least two reactive interstage networks which comprises the steps of applying at the input of said amplifier a test signal whose frequency is relatively high in the passband of said amplifier, substantially short-circuiting the reactive interstage network associated with one stage, tuning the stray capacities associated with said one stage to resonance, measuring the gain at the output of said amplifier, and adjusting the gain of said one stage with said reactive interstage networks and said stray capacities unshorted to equal said measured gain.

3. The method of lining up a broad band amplifier which comprises the steps of applying a discrete high frequency test signal within said band to the input of said amplifier, modifying the transmission effect of the output of said amplifier to approximate the transmission effect thereof for a low frequency within said band, making a first gain measurement at the output of said amplifier, making a second gain measurement at the output of said amplifier with the transmission effect of said amplifier output unmodified, and adjusting said amplifier output to equate said first and second gain measurements.

4. The method of adjusting the gain of an amplifier at a high frequency to equal the gain it has at a low frequency which comprises the steps of applying to the normal input of said amplifier a test signal of said high frequency, modifying the transmission characteristic of the output circuit of said amplifier to approximate its transmission characteristic at said low frequency, measuring the amplitude of said test signal at the normal output of said amplifier, and adjusting the gain of said amplifier with its output circuit unmodified to equate the amplitude of said test signal at said output with said measured value.

5. The method of adjusting the gain of an amplifier employing reactive load elements to peak the gain of said amplifier at high frequencies and having appreciable shunt parasitic capacitance at its output at said high frequencies which comprises the steps of measuring the gain of said amplifier to a low frequency at which said peaking elements have little or no effect by applying to said amplifier a test signal of one of said high frequencies, bypassing said reactive load elements, and tuning said shunt parasitic capacitance to resonance, and equating the gain at the frequency of said test signal with said measured gain employing the same test signal.

6. The method in accordance with claim 5 and the additional step of compensating for variations in the simulated low frequency transmission characteristic from the actual transmission characteristic of said amplifier at said low frequency when measuring said low frequency gain.

References Cited in the file of this patent

UNITED STATES PATENTS 1,732,311 Nyquist -------------- Oct. 22, 1929

OTHER REFERENCES

Noll: "Television for Radiomen" publ. by The MacMillan Co., 1952, (particularly chapter 13, pages 510, 511).

Terman: "Radio Engineer's Handbook," first edition 1943, McGraw Hill Publ. Co. (particularly pages 373–375).